United States Patent
Pettigrew

(10) Patent No.: US 6,602,143 B2
(45) Date of Patent: Aug. 5, 2003

(54) POOL CUE TIP SHARPENING DEVICE

(76) Inventor: O. Brian Pettigrew, 3, rue de Saint-Senoch, 75017 Paris (FR)

(*) Notice: Subject to any disclaimer, the term of this patent is extended or adjusted under 35 U.S.C. 154(b) by 0 days.

(21) Appl. No.: 09/854,854

(22) Filed: May 14, 2001

(65) Prior Publication Data

US 2002/0010031 A1 Jan. 24, 2002

Related U.S. Application Data

(63) Continuation-in-part of application No. PCT/US00/12807, filed on May 11, 2000.
(60) Provisional application No. 60/197,504, filed on Apr. 18, 2000, provisional application No. 60/147,169, filed on Aug. 4, 1999, provisional application No. 60/138,454, filed on Jun. 10, 1999, and provisional application No. 60/133,591, filed on May 11, 1999.

(51) Int. Cl.[7] .................. A63D 15/00; A63B 67/00; B24B 33/00; B27L 9/00; B26B 11/00
(52) U.S. Cl. .................. 473/1; 473/49; 30/494; 7/160; 451/552
(58) Field of Search .................. 473/1, 35, 36, 473/44, 46, 49, 569; 451/552, 540, 541, 346, 461; 30/494, 495, 451–462; 7/160, 164, 158; D21/782

(56) References Cited

U.S. PATENT DOCUMENTS

| | | | | |
|---|---|---|---|---|
| 840,716 A | * | 1/1907 | Schroeder | 30/494 |
| 955,819 A | * | 4/1910 | Mahoney | 30/494 |
| 1,079,687 A | * | 11/1913 | Balzano | 30/494 |
| 1,279,734 A | * | 9/1918 | McCarthy | 30/494 |
| 4,471,824 A | * | 9/1984 | Zownir | 473/49 |
| 4,594,782 A | | 6/1986 | Willard | |
| D286,852 S | * | 11/1986 | Ditmanson | D8/61 |
| 4,620,370 A | * | 11/1986 | Zownir et al. | 30/494 |
| 4,785,586 A | * | 11/1988 | Kratfel | 473/1 |
| 5,104,122 A | | 4/1992 | Gossman | |
| D332,814 S | | 1/1993 | Gossman | |
| 5,228,160 A | | 7/1993 | Porper | |
| 5,887,350 A | * | 3/1999 | Porper | 30/494 |
| 6,226,825 B1 | | 5/2001 | Method | |
| 6,341,399 B2 | | 1/2002 | Method | |

FOREIGN PATENT DOCUMENTS

WO WO00/67860 11/2000

\* cited by examiner

Primary Examiner—Paul T. Seweil
Assistant Examiner—Mitra Aryanpour
(74) Attorney, Agent, or Firm—Hamilton, Brook, Smith & Reynolds, P.C.

(57) ABSTRACT

A pool cue tip sharpening device includes a cue tip dimpler within a block. The tip dimpler includes a recess having a dimpling wheel rotatably mounted on a first axis. The dimpling wheel has protrusions. The device also includes a tip shaper, wherein the tip shaper includes a concave recess within the block. A cue tip trimmer/burnisher is also within the block.

20 Claims, 4 Drawing Sheets

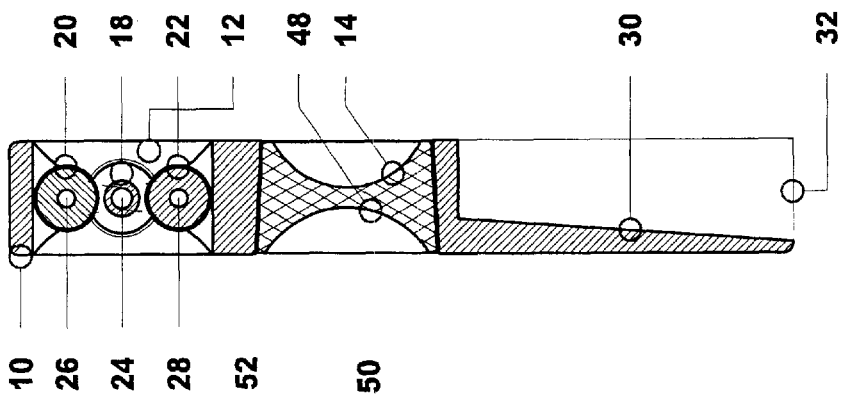
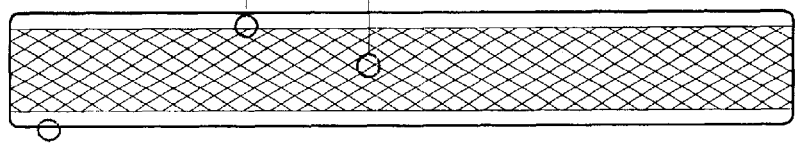
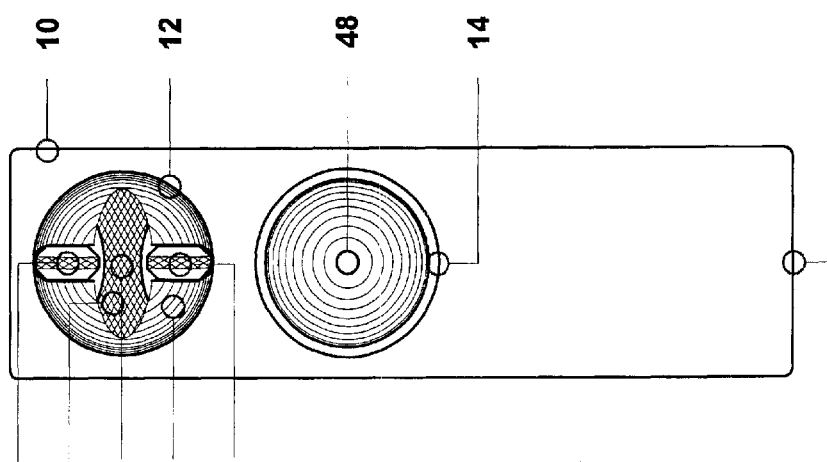
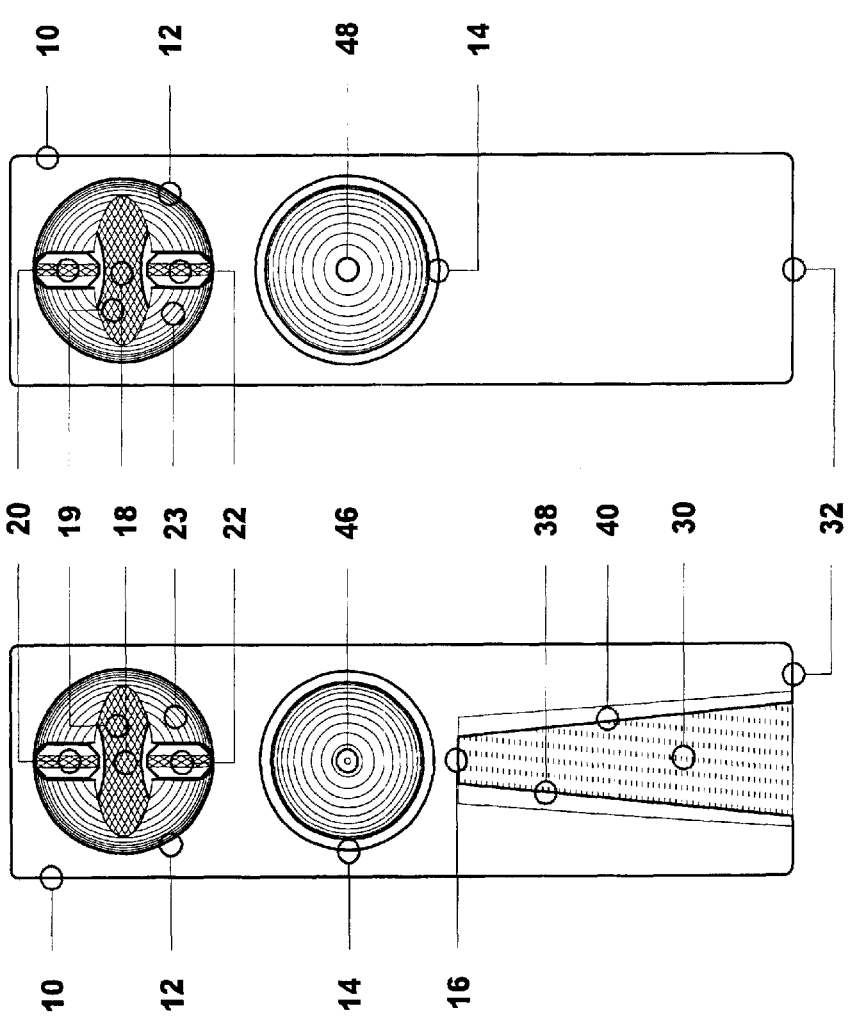

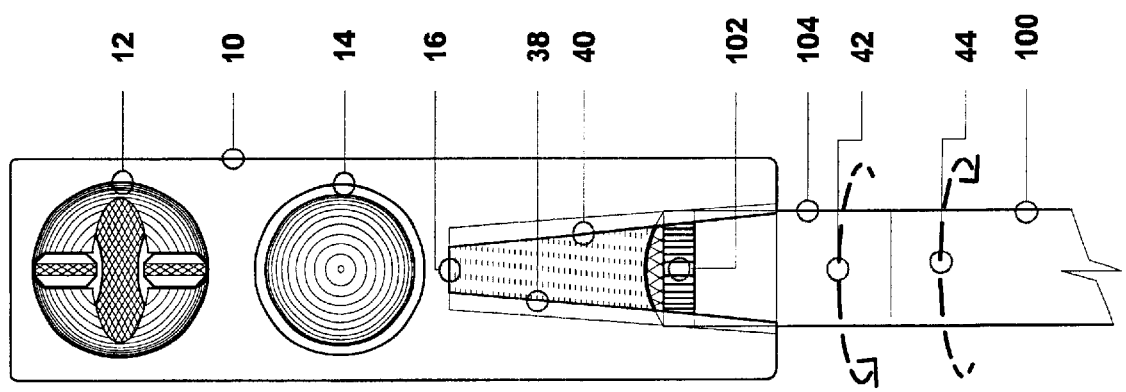
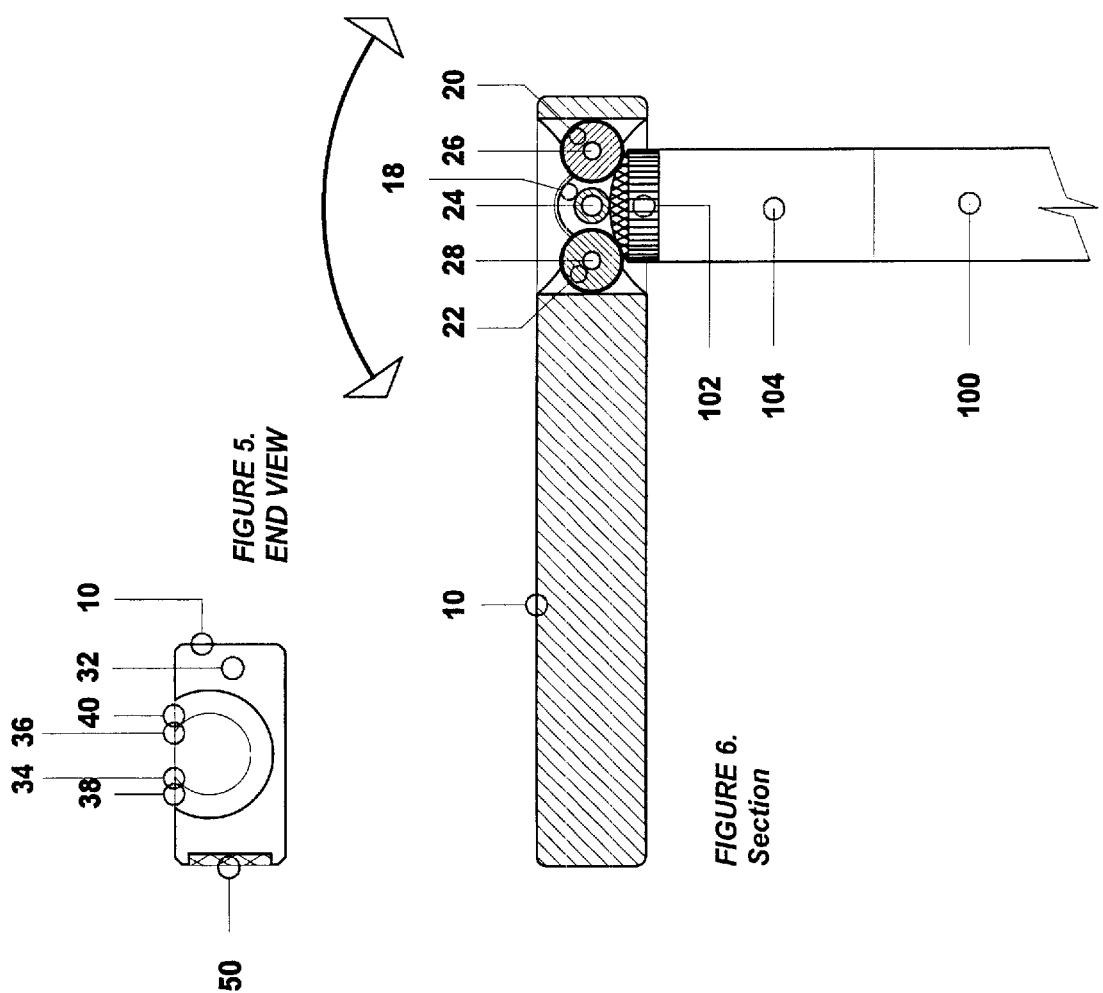

*Cross Section*

*Top Face View*

Plan View of Discs

Axonometric View of Dimpling Wheel

POOL CUE TIP SHARPENING DEVICE

RELATED APPLICATIONS

This application is a continuation-in-part of International Application No. PCT/US00/12807, which designated the United States and was filed on May 11, 2000 and published in English, which claims the benefit of U.S. Provisional Application No. 60/197,504, Apr. 18, 2000, U.S. Provisional Application No. 60/147,169, filed on Aug. 4, 1999; U.S. Provisional Application No. 60/138,454, filed on Jun. 10, 1999; and U.S. Provisional Application No. 60/133,591, filed on May 11, 1999. The entire teachings of the above applications are incorporated herein by reference in their entirety.

BACKGROUND OF THE INVENTION

Conventional pool cues have an elongated shaft. A pool cue tip generally is attached directly to the end of the cue shaft by an adhesive. A ferrule surrounds the end of the pool cue shaft to prevent the end from splitting. A leather tip piece is about six millimeters (0.236 inches) thick and serves as the portion of the pool cue which strikes the pool or billiard balls. The leather tip piece extends beyond the ferrule so that it can be used to strike balls. The leather material is a somewhat resilient buffer material between the ball and the shaft and provides sufficient adherence to the ball surface to allow the ball to be spun.

The condition of the leather tip is important for optimal performance. However, it is difficult to maintain the leather tip sufficiently for accurate and reliable pool playing. Preferably, the tip should have a slightly convex top surface with its annular side wall being slightly tapered from the top surface down to the ferrule. If the tip becomes overly rounded, a reliable striking area for the top surface of the tip is reduced, thereby resulting in problems with reliability, accuracy and shot making. If the leather tip becomes flattened, its resilience and adherence is generally decreased, as is the ability to strike a pool ball off center to provide spinning to the pool ball. When flattened, the leather tip also generally becomes hard and smooth, losing its tackiness.

Therefore, a need exists for an improved device for maintaining pool cue tips.

SUMMARY OF THE INVENTION

The pool cue tip sharpening device is a multifunctional tool designed to maintain the leather tip of a cue stick used in the games of billiards, pool and snooker. The purpose of the pool cue tip sharpening device is to properly shape and maintain the cue tip for optimum performance by a player.

The pool cue sharpening device includes a cue tip dimpler, a tip shaper, and a cue tip trimmer/burnisher within a block. The cue tip dimpler within the block includes a recess having a dimpling wheel rotatably mounted on a first axis. The dimpling wheel has protrusions. The tip shaper includes a concave recess within the block. The cue tip trimmer/burnisher is within the block. The pool cue tip sharpening device combines a number of devices, each of which performs a specific task, into one hand held tool, including the following:

A dimpler is a device designed to produce small, uniform indentations or "dimples" on the surface of the leather tip in order to allow the tip to absorb larger amounts of chalk when the tip is "chalked" by a player. The concave shaped wheels centered in a recess of the tool have a regularly textured surface that are designed to provide a number of uniform impressions or "dimples" on the surface of the leather cue tip. The rotation of the tool over the cue tip, with the application of hand pressure, allows the textured surface of the wheels to "dimple" the cue tip into which dimples the chalk is optimally absorbed by the subsequent usual and normal rotation of a chalk cube by the player. The cue tip dimpler within the block can include a recess having one or more dimpling wheels rotatably mounted on a first axis. The dimpling wheels have protrusions around the circumference of the wheels.

A trimmer/burnisher is a device designed to both trim the side of a leather cue tip in order to maintain the edge flush with the ferrule and burnish the side in order to produce a hard, durable edge. This part of the tool includes a conical cavity into which the cue tip is designed to be inserted, which when rotated under slight pressure, trims the side of the leather cue tip flush with the cue tip ferrule. Once trimmed, the tool polishes or "burnishes" the side of the cue tip in order to harden and shape the leather for better performance. A round shaper is an abrasive device designed to produce two different rounded shapes to the leather tip, known by players as "nickel" and "dime" shapes, reflecting the radius of the U.S. coins.

A shaper can include two abrasive concave hemispherical "shapers" designed to alter the shape of the leather cue tip to two different hemispherical shapes commonly used by players in a multitude of playing situations. In addition, one or more flat abrasive areas set on the side of the tool are designed to produce a flat cue tip, as may be required by the player.

The flat shaper includes an abrasive device designed to produce flat or flattened surface on the leather tip.

The pool cue tip sharpening device can be milled from solid brass or other various milled or cast metals. The device can measure ninety millimeters (3.543 inches) long, twenty-five millimeters (one inch) wide and thirteen millimeters (0.512 inches) high into which the dimpling wheels and abrasive parts are fitted. The abrasive surfaces can be made by the application of various resins onto which loose abrasive material is embedded or with the use of precast abrasive parts.

BRIEF DESCRIPTION OF THE DRAWINGS

FIG. 1 shows a top face view of a pool cue tip sharpening device.

FIG. 2 shows a bottom face view of the pool cue tip sharpening device.

FIG. 3 shows a side view of the pool cue tip sharpening device.

FIG. 4 shows a cross sectional view of the pool cue tip sharpening device.

FIG. 5 shows an end view of the pool cue tip sharpening device.

FIG. 6 shows a cross sectional view of a dimpler in the pool cue sharpening device and a pool cue in the dimpler.

FIG. 7 shows a top view of a trimmer/burnisher with a pool cue inserted therein.

Figure 9:
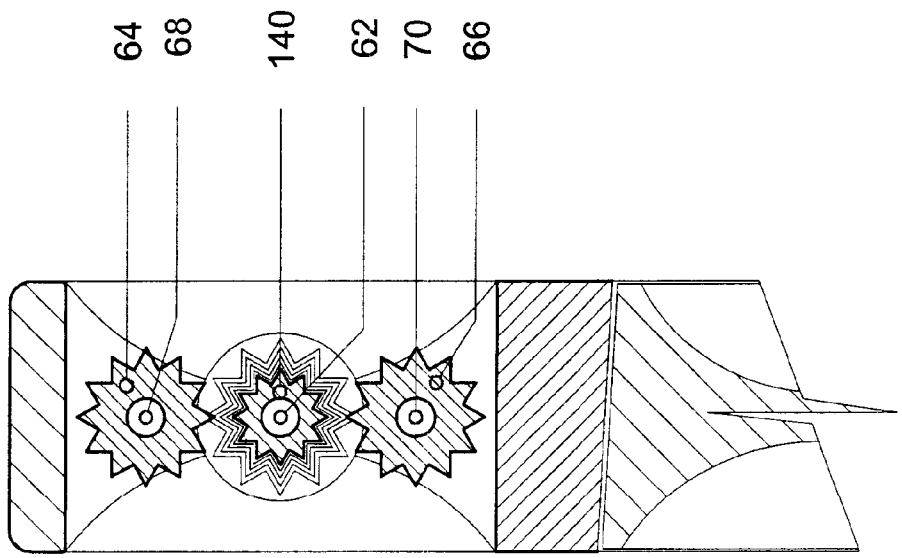
FIG. 9 shows a cross sectional view of the alternative embodiment of the dimpler.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

A top view of the device is shown in FIG. 1. The pool cue tip sharpening device 10, which is formed of a solid block of metal or other hard material. The sharpening device includes a dimpling device 12, an abrasive shaper 14 and trimmer/burnisher 16.

The dimpling device 12 includes a concave shaped dimpling wheel 18 and two guide wheels 20, 22 located on either side, set in a milled concave receptacle 23 on each side of the pool cue tip sharpening device. When the pool cue sharpening device is rotated over a leather tip 102 of a pool cue 100, as shown in FIG. 6, the "dimpling" wheel produces uniform dimples on the tip allowing the tip to collect and hold more chalk following a normal "chalking" by a player.

Returning to FIGS. 1 and 2, the dimpling wheel 18 has sharp, uniform male knurling protrusions 19 which produce small, uniform female indentations or "dimples" on the tip. In one embodiment, the dimpling wheel 18 can be formed from aluminum with a hard nickel plated finish.

The purpose of the guide wheels 20, 22 is to maintain the dimpled tip clear of the frame of the tool during rotation of the pool cue. The guide wheels 20, 22 allow for the appropriate rotations of both small and large cue tips and have similar knurling on their surfaces at the points of contact with the tip.

Dimpling wheel 18 and guide wheels 20, 22 are mounted symmetrically in the center-line of the pool cue sharpening device body 10 with pins 24, 26, 28, allowing for free rotation of dimpling wheel 18 and guide wheels 20, 22, respectively. Each pin protrudes equally into the concave receptacle, as shown in FIG. 4. The pins can be formed of stainless steel or other suitable material. Dimpling may be performed in the receptacles on either side of the pool cue tip sharpening device. In another embodiment, two dimpling wheels can be mounted in the dimpling device with their axes in parallel.

Figure 8:
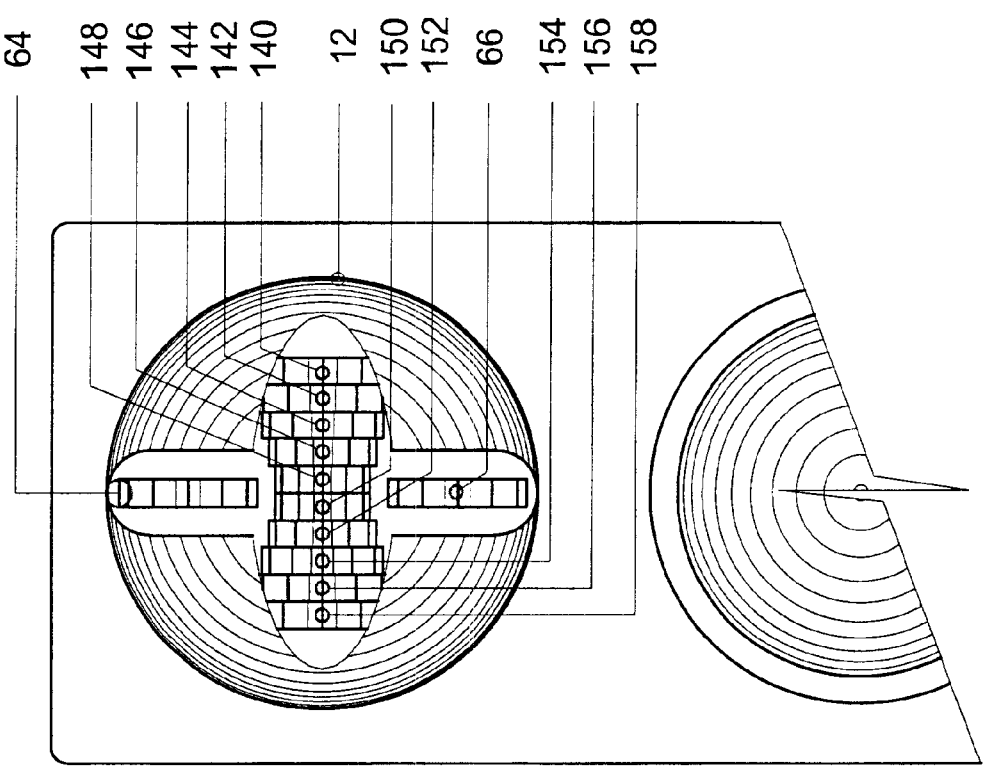
FIG. 8 shows a top face view of an alternative embodiment of the dimpler.
Figures 10, 11:
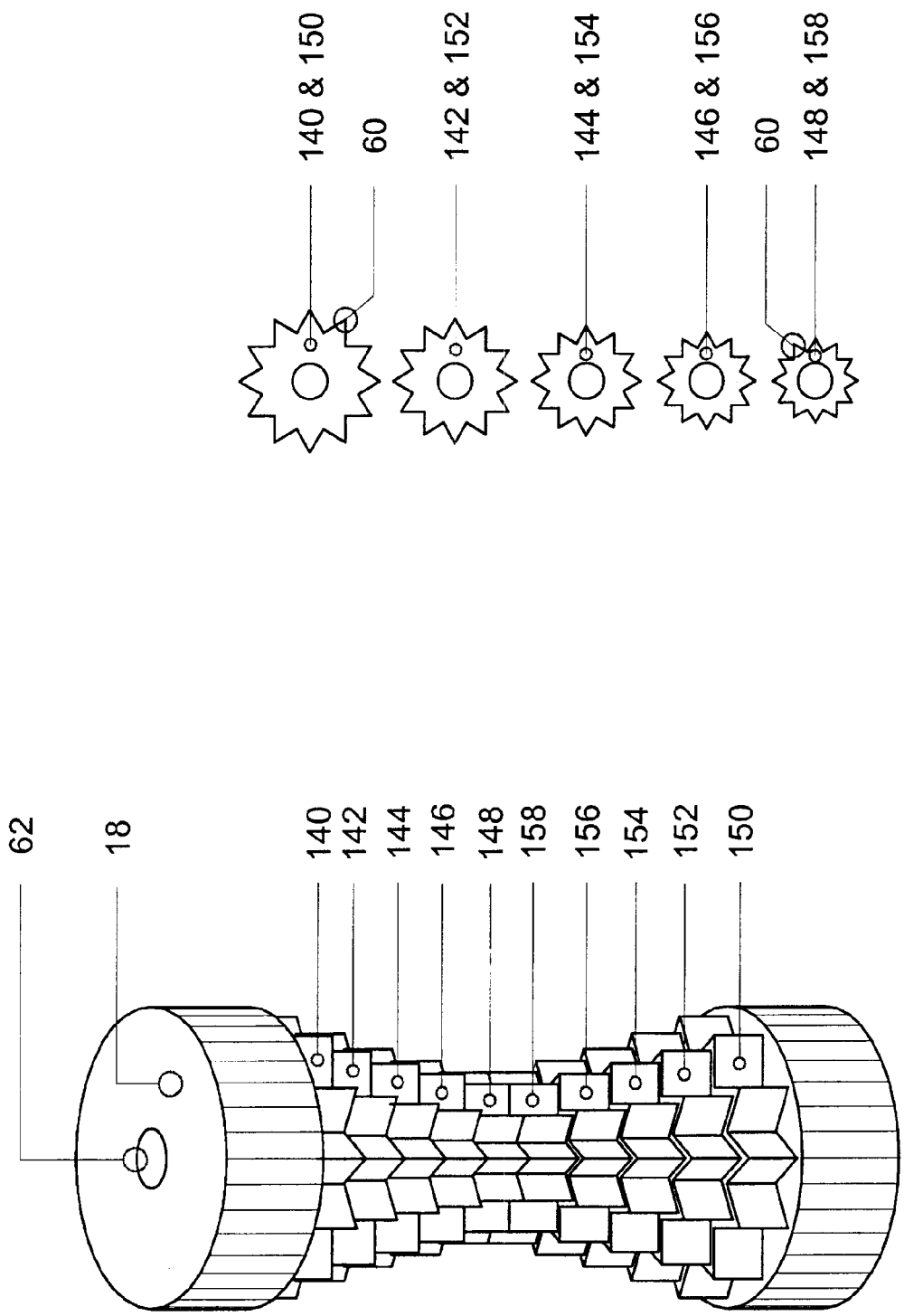
FIG. 10 shows a perspective view of the alternative embodiment of the dimpler.
FIG. 11 shows a plan view of a set of dimpling discs for the dimpler

As shown in FIGS. 8, 9, 10 and 11, an alternative embodiment of dimpling device 12 includes a plurality of discs 140, 142, 144, 146, 148, 150, 152, 154, 156, 158 having a plurality of pointed protrusions 60, such as twelve in number. The discs are rotatably mounted on axis 62. The number of discs can be one or more. The diameters of the disc can vary in size. The embodiment shown is configured into a concave shape with the smaller diameter discs toward the center of the dimpler and larger diameter discs toward the outer portion. The discs can range in diameter of between about 4.45 and 7.37 millimeters (0.175 and 0.29 inches). The discs can have a thickness of about 1.25 millimeters. The protrusions on the wheel are about 1.25 millimeters (0.049 inches) in height. Guide wheels 64, 66 can employ discs as used in the dimpler on axis 68, 70. The discs and guide wheels can be formed from steel, brass, any suitable metal, metal alloy or the like.

Returning to FIG. 1, trimmer/burnish 16 includes a conical bore 30, which is set in the first end 32 of the pool cue sharpening device 10 into which a range of small or large cue tips can be placed. The bore 30 is formed off-center so that a side of the tip 102 extends slightly outside the body of the tool as shown in FIGS. 5 and 7. The left side 34 of the bore, where it breaks the surface of the tool, is maintained as a sharp cutting edge 38. The right side 36 is maintained as a dull or rounded edge 40.

By rotating the cue 100 to the left direction 42 toward the cutting edge, the leather tip 102 may be trimmed flush with the cue ferrule 104, thus maintaining a clean precise edge and eliminating "mushrooming" of the tip 102 following normal use. By rotating the cue to the right direction 44 toward the dulled edge 40, the leather tip may be burnished, a process produced by compressing the fibers against the cone side wall, thus maintaining a hardened durable side wall surface.

Returning to FIG. 1, the device 10 also includes a round shaper device 14 which can be fabricated from solid abrasive materials formed to fit, such as with epoxy adhesives, as an insert in the pool cue sharpening device. The abrasive insert 14 can include two concave surfaces reflecting the diameters of U.S. dime 46 and nickel coins 48, the common preferred shapers for players. The nickel coin shaper 48 is shown in FIG. 2. Insertion and rotation of a leather cue tip into either concave shape can grind the tip to the shape desired. The shapers typically have a diameter in the range of between about 15 and 25 millimeters (0.591 inches and one inches). The shapers can be formed with a surface of silicon carbide abrasive material or the like.

FIG. 3 shows a flat shaper 50 device which can be fabricated from a solid abrasive material in a flat strip and fitted with an epoxy adhesives into a recess milled in the side of the pool cue sharpening device 10. Sanding a leather cue tip with the flat abrasive strip 52 allows a player to shape the tip as desired. The flat shaper can be formed with a surface of silicon carbide abrasive materials or the like.

While this invention has been particularly shown and described with references to preferred embodiments thereof, it will be understood by those skilled in the art that various changes in form and details may be made therein without departing from the scope of the invention encompassed by the appended claims.

What is claimed is:

1. A pool cue sharpening device, comprising:
   a) a cue tip dimpler within a block, wherein said tip dimpler includes a recess having a dimpling wheel rotatably mounted on a first axis, said dimpling wheel having protrusions;
   b) a tip shaper, wherein said tip shaper includes a first concave recess within said block; and
   c) a conical cue tip trimmer/burnisher within said block for trimming the side of a leather cue tip in order to maintain an edge flush with a ferrule of the pool cue and for burnishing the side in order to produce an edge.

2. The device of claim 1 wherein tip shaper includes a surface having an abrasive material.

3. The device of claim 1 wherein said dimpler further includes two guide wheels rotatably mounted on a second axis and third axis, respectively, parallel to said first axis.

4. The device of claim 1 wherein said concave recess of said tip shaper has a diameter in the range of between about fifteen and twenty-five millimeters (0.591 and one inches).

5. The device of claim 1 wherein said tip shaper further includes a second concave recess within said block.

6. The device of claim 5 wherein said second concave recess has a diameter in the range of between about fifteen and twenty-five millimeters.

7. The device of claim 1 wherein said block includes an exterior surface having an abrasive strip.

8. The device of claim 1 wherein said block includes a metal.

9. A pool cue sharpening device, comprising:
 a) a cue tip dimpler within a block, wherein said tip dimpler includes a recess having a plurality of dimpling wheels each rotatably mounted on a same first axis, said dimpling wheels having protrusions;
 b) a tip shaper, wherein said tip shaper includes a concave recess within said block; and
 c) a cue tip trimmer/burnisher within said block.

10. The device of claim 9 wherein the dimpling wheels include an arrangement to form a concave shape for receiving a cue tip.

11. The device of claim 9 wherein said dimpler further includes two guide wheels rotatably mounted on a second axis and third axis, respectively, parallel to said first axis.

12. The device of claim 9 wherein said tip shaper further includes a second concave recess within said block.

13. The device of claim 9 wherein said trimmer/burnisher includes a conical bore.

14. The device of claim 9 wherein said block includes an exterior surface having an abrasive strip.

15. The device of claim 9 wherein said block includes a metal.

16. A device for maintaining pool cue tips, comprising:
 a) a cue tip dimpler within a block, wherein said tip dimpler includes a recess having more than one dimpling wheel each rotatably mounted on a first axis, said dimpling wheels having protrusions; and
 b) two guide wheels rotatably mounted on a second axis and third axis, respectively, parallel to said first axis, but each different from the first axis.

17. The device of claim 16 wherein said cue tip dimpler includes ten dimpling wheels rotatably mounted on the first axis, said dimpling wheels having protrusions.

18. A pool cue sharpening device, comprising:
 a) a cue tip dimpler on a block, wherein said tip dimpler includes a concave surface and having protrusions for dimpling a cue tip;
 b) a tip shaper, wherein said tip shaper includes a concave recess within said block; and
 c) a conical cue tip trimmer/burnisher within said block for trimming the side of a leather cue tip in order to maintain an edge flush with a ferrule of the pool cue and for burnishing the side in order to produce an edge.

19. The device of claim 18 wherein said tip shaper further includes a second concave recess within said block.

20. The device of claim 18 wherein said block includes an exterior surface having an abrasive strip.

* * * * *